United States Patent [19]

Baer

[11] Patent Number: 4,642,637
[45] Date of Patent: Feb. 10, 1987

[54] METHOD FOR TRANSMITTING DATA VIA A LINE OF AN ALTERNATING CURRENT DISTRIBUTION NETWORK, AND A TRANSMITTER FOR CARRYING OUT THE METHOD

[75] Inventor: Hanspeter Baer, Uster, Switzerland

[73] Assignee: Zellweger Uster, Ltd., Uster, Switzerland

[21] Appl. No.: 767,597

[22] Filed: Aug. 20, 1985

[30] Foreign Application Priority Data

Aug. 27, 1984 [CH] Switzerland .................. 4077/84
Apr. 3, 1985 [CH] Switzerland .................. 1445/85

[51] Int. Cl.$^4$ ............................................ H04M 11/04
[52] U.S. Cl. ............................ 340/870.19; 340/310 R; 375/23
[58] Field of Search .............. 375/22, 23; 370/8; 340/870.24, 870.13, 310 A, 310 R, 870.19, 870.02, 870.03, 825.63, 825.64

[56] References Cited

U.S. PATENT DOCUMENTS 3,394,364 7/1968 Bruce et al. ................. 340/870.24
3,525,078 8/1970 Baggott ....................... 340/310 R

FOREIGN PATENT DOCUMENTS 1153908 6/1969 United Kingdom ........... 340/310 A

Primary Examiner—John W. Caldwell, Sr.
Assistant Examiner—David A. Okonsky
Attorney, Agent, or Firm—Antonelli, Terry & Wands

[57] ABSTRACT

The transmitter generates a current signal typical of the data to be transmitted, as a load current of a specific load resistance. To transmit this current signal, the load resistance is connected for a short time to a voltage source, with the result that a series of current pulses (I) is produced. The times of generation and/or the duration of these current pulses are chosen so that the resulting transmitted signal corresponds at least approximately to a desired theoretical signal (R). The method is very flexible with regard to the frequency of the current signal, and the transmitter requires neither amplifiers nor tuned resonant circuits which play a role in determining the transmission frequency. The method is particularly suitable for transmission, to a central unit, of data concerning, for example, the counter reading from counters distributed over the network or concerning the executed command from ripple control receivers.

27 Claims, 8 Drawing Figures

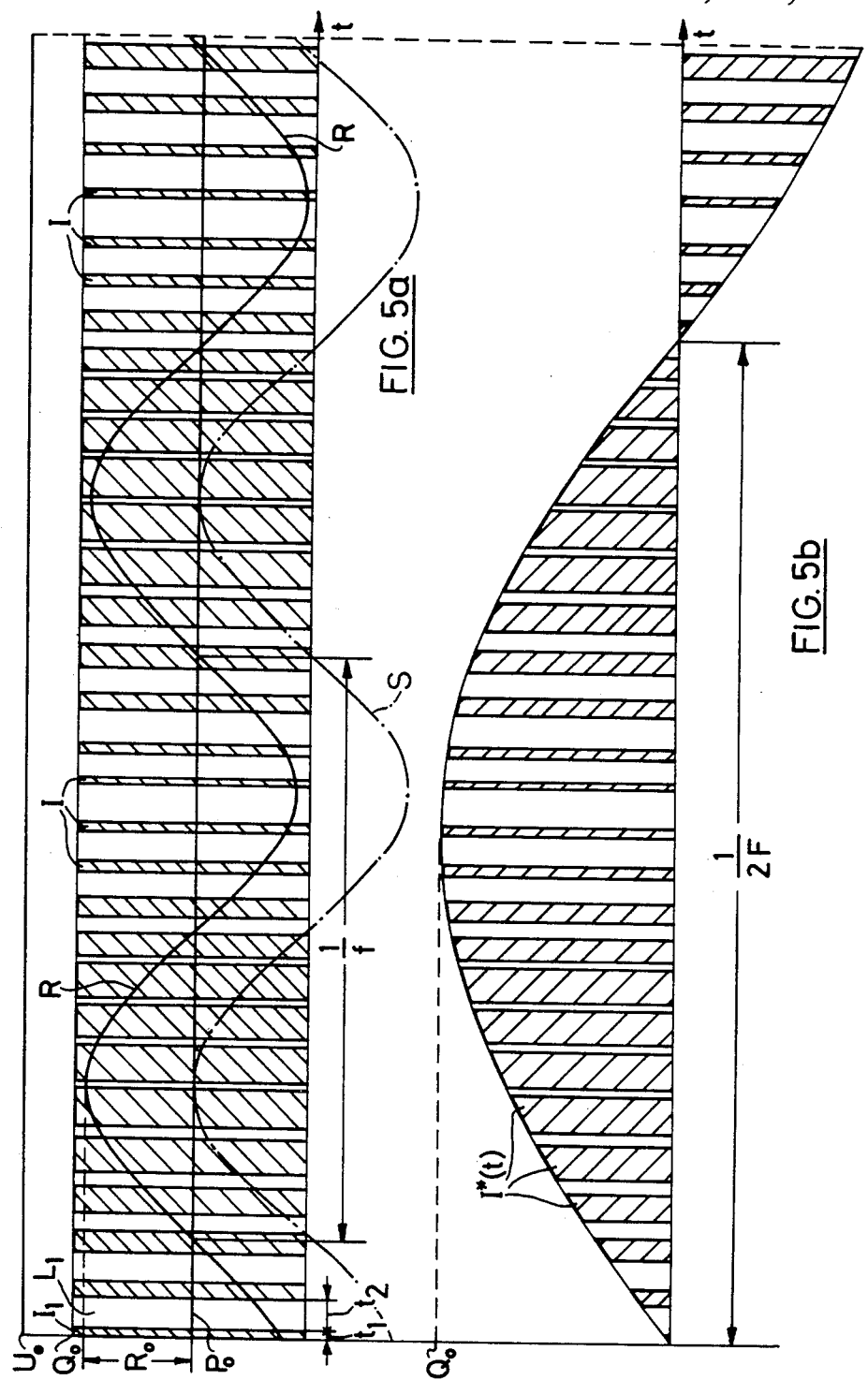

METHOD FOR TRANSMITTING DATA VIA A LINE OF AN ALTERNATING CURRENT DISTRIBUTION NETWORK, AND A TRANSMITTER FOR CARRYING OUT THE METHOD

BACKGROUND OF THE INVENTION

The invention relates to a method and apparatus for transmitting data over a line of an alternating current distribution network, in which a current signal typical of the data to be transmitted is generated and input into the network.

A method of this type is intended, for example, to report back the counter reading from counters distributed over the network, or information about executed commands from ripple control receivers, to a central unit, such as used in the textile industry. This remote indication requires a large number of transmitters which as far as possible should be inexpensive, and have a relatively low power rating, whereas the central receiver may tend to be expensive. The signal evaluated by the receiver is either the current signal itself or a signal derived from this, such as, for example, the resulting voltage drop at the leakage inductance of the transformer feeding the network.

In conventional methods of this type, two of which are described in, for example, German Patent Specification No. 2,820,213, and Swiss Patent Specification No. 540,607, the transmitter contains a network which is connected to the power supply terminals either directly or via a controllable switch. This network is a frequency-selective, tuned resonant circuit, one of the factors determining the resonant frequency being the desired transmission frequency. Moreover, in the method according to Swiss Patent Specification No. 540,607, the transmission signal generated in a power stage is coupled into the network via a transformer.

Apart from the fact that the power required for the current signal is first taken from the network and then returned to the network, the frequency-selective network constitutes a severe restriction in that it makes it difficult to modify the transmission frequency during operation. The active part of the transmitter is formed by a suitable amplifier stage, which has to be protected from high voltages by appropriate filters.

SUMMARY OF THE INVENTION

By means of the invention, it is now intended to provide a method of the type described, in which neither an amplifier stage nor a network tuned to the transmission frequency is required, and which therefore has high flexibility with regard to the frequency of the current signal to be transmitted.

This object is achieved, according to the invention, by a method in which a current signal is generated on the power lines as a load current of a network which can be connected to a voltage source via a switch, the network is connected repeatedly for a short time to the voltage source in order to transmit the current signal, and a series of current pulses are thus produced, and the time of generation and/or the duration of these current pulses are chosen so that the resulting transmission signal corresponds at least approximately to a desired theoretical signal of selected frequency and/or waveform.

According to a preferred further development of the method according to the invention, the network constitutes the voltage source. The supply voltage therefore may be sinusoidal and have an amplitude of 220 V RMS (when the network is connected between one phase and neutral) or 380 V RMS (when the network is connected between two phases) and a frequency of 50 Hz. However, the invention obviously is applicable as well to power systems having other parameters.

The desired theoretical signal, which in practice corresponds to the transmission signal, can be, for example, an amplitude-modulated, frequency-modulated or phase-modulated signal of a particular carrier-frequency. Transmission both within a certain voltage level (low voltage or medium voltage) or between the low voltage and the medium voltage level is possible.

If the network constitutes the voltage source, a certain amount of effort is required in the transmitter in order to compensate for the change in the amplitude and sign of the power supply voltage. This means that the transmitter must have, in particular, some means of indicating the actual phase position of the power supply voltage.

In another preferred further development of the method according to the invention, this method is simplified in such a way that compensation of the change in the amplitude and sign of the power supply voltage is no longer necessary, so that a knowledge of the actual phase position of the power supply voltage is not required. This preferred further development is characterized in that, in fixing the control signal which controls the switch, the theoretical assumption is made that the voltage source is a direct current voltage source, and this control signal is chosen so that the signal formed by arranging the current pulses side by side has as large a spectral part as possible at the frequency of the desired theoretical signal.

When the control signal for the switch is constructed on the basis of these criteria and the resulting transmission signal with the sinusoidal power supply voltage of frequency F is then analyzed, it is found that the supply voltage leads to an amplitude-modulation of the original transmission signal derived theoretically from a direct current voltage. If the frequency of the desired theoretical signal is f, then, although the signal component at f will vanish, it will be replaced by two components at f+F and f−F, which correspond to the sidebands in amplitude modulation, which are well known from modulation theory, and can be evaluated in the receiver by suitable demodulation processes.

The invention furthermore relates to a transmitter for carrying out this stated method. This transmitter is characterized by a computer which supplies a control signal for the switch and which is designed for the input of characteristics of the supply voltage and of the desired theoretical signal.

In a first preferred embodiment of the transmitter according to the invention, the stated characteristics represent amplitude values and phase values. In a second preferred embodiment of the transmitter according to the invention, the stated characteristics represent amplitude values of the power supply voltage and of the desired theoretical signal.

The latter transmitter therefore does not have to take into account the phase values of the power supply voltage and is simpler in design because the synchronization circuit for synchronization of the switching times of the switch with the actual phase of the power supply voltage is dispensed with.

BRIEF DESCRIPTION OF THE DRAWINGS

The invention is illustrated in more detail with reference to various embodiments in the drawings; wherein:

FIGS. 5a and 5b show a second diagram of the signal curves applicable to a further embodiment of the present invention.

DETAILED DESCRIPTION OF THE PREFERRED EMBODIMENTS

Figure 1:
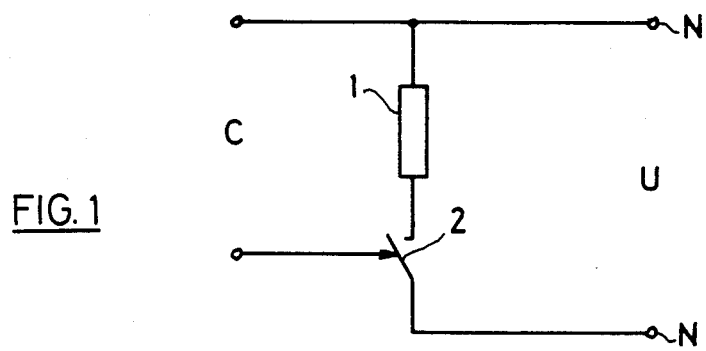
FIG. 1 is a basic circuit diagram to illustrate the operation of generating a signal on the power line according to the invention.

FIG. 1 shows a circuit including a resistance 1, which can form the simplest embodiment of a network connected as a load, and a controlled switch 2, which is connected in series with the resistance 1 to the network terminals N across which a supply voltage V is applied. The switch 2 is switched by means of a control signal C. If the switch 2 is closed, a current determined by the supply voltage U and the resistance 1 flows along the power supply lines. When switch 2 is open, no current flows. If the opening and closing times of the switch 2 are varied in a controlled manner, and the resulting current signal I in the network N is observed, then this current signal, too, varies with time. In particular, the mean value of this resulting current signal measured over a certain period of time also varies as a function of the opening and closing times of switch 2.

The combination of resistance 1 and the switch 2, which is opened and closed again in rapid sequence, can therefore be regarded as a variable resistance provided that only the mean resistance is measured over a period which is substantially longer than the typical switching period of the switch 2. These circumstances are utilized in the transmission method according to the invention, the standard supply voltage of 220 V RMS or 380 V RMS and 50 Hz being used as the voltage source U in a first embodiment of the invention.

Figure 2:
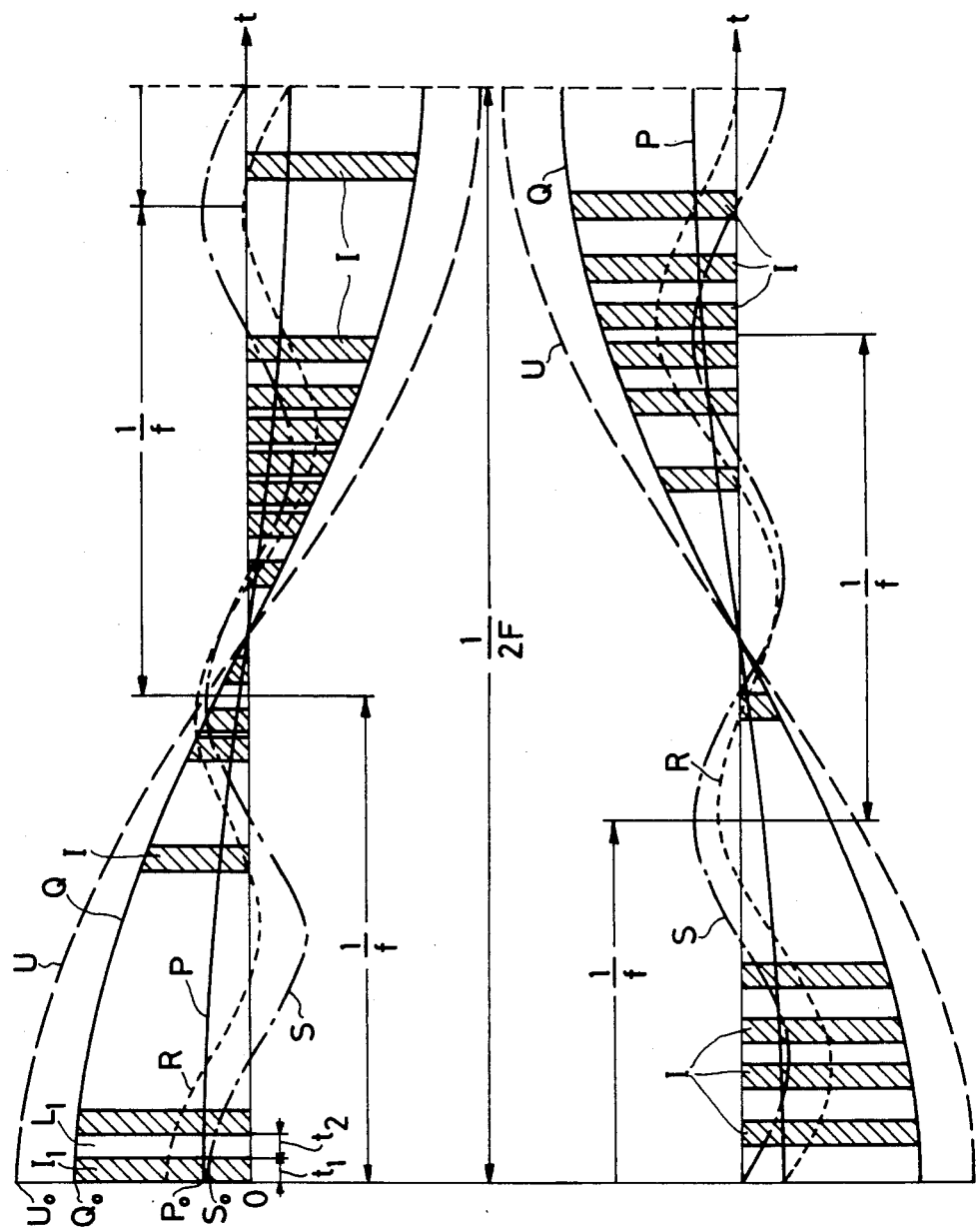
FIG. 2 shows a first diagram of the signal curves relating to the operation of the circuit of FIG. 1.

FIG. 2 is a diagram showing the shape of the various signals relating to the operation of the circuit of FIG. 1, this being shown in each of the two lines for a half period ($\frac{1}{2}$F) of the voltage source U formed by the supply voltage. The time t is plotted along the abscissa, and the instantaneous values of the voltage signals and current signals shown are plotted along the ordinate. The sinusoidal current signal Q results when the resistance 1 is connected permanently to the sinusoidal supply voltage U via the switch 2. The switch 2 is closed and opened for a short time by means of the control signal C (FIG. 1). This results in a sequence of current pulses I, corresponding to the switching times of the switch 2. The times during which switch 2 is closed to give a single pulse I are preferably chosen to be of constant duration, while the open times are chosen to be of variable duration. By arranging side by side an uninterrupted series of individual pulses of constant duration, it is also possible to produce longer pulses, the duration of which is a multiple of the duration of an individual pulse I.

The current signal S represents a desired carrier-frequency transmission signal of amplitude $S_O$, from which the desired theoretical signal R is derived. In the illustration in FIG. 2, the carrier-frequency signal S is sinusoidal, and its amplitude and/or phase and/or frequency is further modulated in practice for effecting the desired data transmission. This modulation has been omitted in the figure for the sake of clarity, it being understood that various types of modulation may be employed in accordance with the present invention. As shown in the figure, the frequency f of the carrier-frequency signal S is about four times the frequency F of the voltage source U, and in practice is between about 100 Hz and 2500 Hz. For reasons which will be explained below, a portion P, which is proportional to the signal Q, is superimposed on the carrier-frequency signal S, and the current signal R is thus obtained as the desired theoretical carrier signal on which data may be modulated.

In the transmission method according to the invention, the transmitter generates a sequence of pulses I by opening and closing the switch 2, which pulse sequence should show as good agreement as possible with the desired waveform and/or frequency of the theoretical signal R. The manner in which the desired theoretical signal R is approximated by a pulse signal is described in detail below.

If the first current pulse $I_1$ of duration $t_1$ in the first line of FIG. 2 and the gap $L_1$ of duration $t_2$ which follows this pulse are considered, it will be seen that the mean current resulting in the interval $t_1+t_2$ is of the same magnitude as the mean value of the desired theoretical signal R in the same interval $t_1+t_2$. This shows that, by suitable choice of the time of generation of the current pulses I and/or of their duration, it is possible to generate a signal whose mean value over a period of time (determined over an interval which is a multiple of the duration of an individual pulse but shorter than the period of the carrier-frequency signal S) corresponds in practice to the mean value of the desired theoretical signal.

Since the current pulses I can only be transmitted when the instantaneous values of the signals Q and R have the same sign, which is ensured on average only in 50% of all cases, the above-mentioned 50 Hz portion P of amplitude $P_O$ is superimposed on the carrier-frequency signal S so that the stated percentage is increased to above 50%.

In the practical embodiment of a transmitter for the transmission method described, the switch 2 (FIG. 1) must be appropriately actuated. According to the embodiment of FIG. 3, this is effected by means of a suitable computer 3 which supplies the control signal C for the switch 2. The computer 3 has two sets of inputs, one for input of the amplitude values $Q_O$ (signal Q), $S_O$ (signal S) and $P_O$ (superimposed 50 Hz portion P), and one for input of a value $\alpha$, which contains information about the phase of the supply voltage U. The computer 3 determines the optimum pulse sequence on the basis of these signal inputs and actuates the switch 2 accordingly. The switching times are dependent on the actual phase of the sinusoidal supply voltage U, since this phase is one of the factors determining the amplitude of the resulting current pulse. For this reason, the computer 3 must be supplied periodically with information about the actual value of the phase of the signal U. This is preferably effected by means of a cross over detector 8, at the input of which the supply voltage U is applied. Thus, the computer 3 periodically detects the times at which the phase of the supply voltage assumes a defined value. For a known duration of period 1/F of the supply voltage U, the computer 3 can thus also calculate the intermediate values of the phase of the supply voltage U.

There are many possible versions for establishing the criteria for the determination of the optimum pulse sequence by the computer 3. Those below are given only by way of example:

(A) the integral over the actual transmitted pulse I (FIG. 2) is equal to the area of the desired transmission signal, including the superimposed 50 Hz portion, from the beginning of the present transmitted pulse to the beginning of the next transmitted pulse; or (B) the values of the integrals of pulse signal I and the desired signal R (FIG. 2) over a certain short section of the transmitted signal of, for example, one sixteenth of the period 1/f are compared. The number of pulses and their position—for constant pulse duration—are chosen within the section so that the square deviation of the integrals is a minimum. The square deviation can be defined in various ways, and it is also possible, in particular, to analyze the square deviation of subsections and to use these for deciding on the number and position of the transmission pulses I; or (C) choice of the pulse signal which correlates as well as possible with the corresponding section of the desired transmission signal R.

Figure 4:
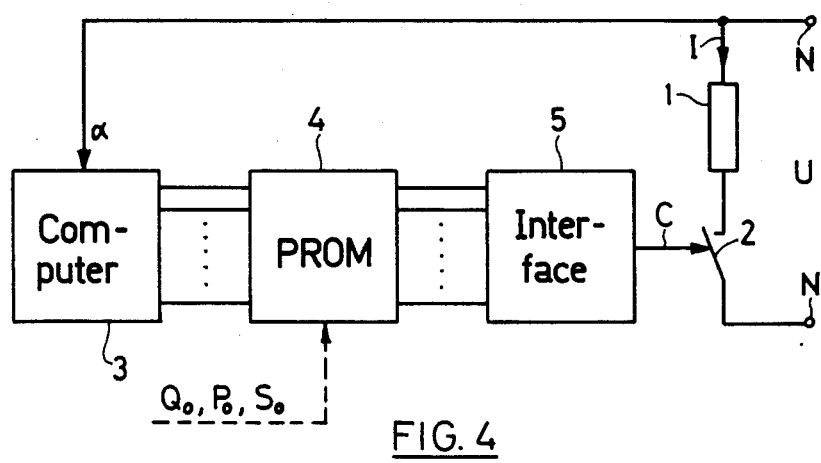
FIG. 4 is a block diagram of a second embodiment of a transmitter according to the invention.

In the example shown in FIG. 4, a programmable read only memory (PROM) 4 and an interface 5 are arranged between the computer 3 and the switch 2. In this example, the transmission times for transmission pulses I (FIG. 2) are not calculated on-line but are precomputed for all combinations of the possible phase values of the signals U and S and for a particular choice of amplitudes $P_O$, $Q_O$, $S_O$, and are stored in the memory 4. The computer 3 preferably determines the actual phase values of the carrier-frequency signal S and of the supply voltage U, and then determines the address formed by these two values in the memory 4. The computer 3 then finds information about the further shape of the pulse sequence under this address in the memory 4. The use of memory 4 relieves the computer 3 of certain overhead.

When the transmitter is implemented in microprocessor technology, the signals, in particular the calculated phase values of the signals S and U, as well as the transmission times of the pulses I, are preferably quantized. To do this, the range between 0 and $2\pi$ of the phases of the carrier-frequency signal and the supply signal are each divided into, for example, 128 steps, and the actual phase values of the carrier-frequency signal S and of the supply voltage U are determined by means of the computer 3, using a counting process with equidistant, equal increments. It is precisely these values which are the addresses for the memory 4, which in turn contains, as an output, for example, the sequence for the transmission of the transmission pulses I (FIG. 2) for a particular time interval, during which, for example, up to 8 pulses can occur.

For example, the memory 4 could provide the sequence "01101000" at a particular time. The interface 5 which accepts this sequence interprets it, for example, as follows: the switch 2 is to be kept open during time intervals 1, 4, 6, 7 and 8, each of which lasts for 1/128 of the period of the signal S (this information is characterized by a "0" in the sequence), whereas it is to be closed during the intervals 2, 3 and 5 ("1" in the sequence). When all 8 intervals have elapsed, a new sequence is taken from the memory 4, the phase values of the supply voltage U and of the carrier-frequency signal S which are valid in this case constituting the address of the new sequence. The elements for calculating the phase values can be realized by means of simple binary counters.

The interface 5 can be, for example, a shift register, in which the sequence of pulses and gaps for the 8 substeps is read in simultaneously from the memory 4 and then transmitted sequentially to the switch 2, in the form of control signal C. Switch 2 is preferably a high-power transistor.

The memory 4 can also output, as an output parameter, the duration of the next pulse and of the subsequent gap; at the end of this gap, the computer 3, with the currently valid phase values of the carrier-frequency signal and supply voltage, requests the duration of the next pulse and of the associated gap. In this case, the interface is provided in the form of a time counter.

FIG. 5a is a diagram showing the shape of the various signals in a circuit according to FIG. 1, but differs from the diagram of FIG. 2 in assuming that the network supplies a direct current voltage of the value $U_O$. The time t is plotted along the abscissa, and the instantaneous values of the current signals shown are plotted on the ordinate. The direct current $Q_O$ results when the resistance 1 is connected permanently to the direct current voltage $U_O$ via the switch 2. By means of the control signal C (FIG. 1), the switch 2 is closed and opened for short periods. This results in a sequence of current pulses I, corresponding to the switching times of the switch 2.

The times during which switch 2 is closed for an individual pulse are preferably chosen to be constant. By arranging side by side an uninterrupted series of individual pulses of constant duration, it is also possible to produce longer pulses, the duration of which is a multiple of the duration of an individual pulse I.

The current signal R represents the desired carrier-frequency transmission signal of amplitude $R_O$, which additionally possesses a direct current component $P_O$, which will be discussed below. As shown in the figure, the carrier-frequency signal R is sinusoidal, its amplitude and/or phase and/or frequency being further modulated in practice for data transmission. This modulation has been omitted in the figure for the sake of clarity. In practice, the frequency f of the carrier-frequency signal R is between about 100 Hz and 2500 Hz.

If, in FIG. 5a, the first current pulse $I_1$ of duration $t_1$ and the gap $L_1$ which follows this pulse and is of duration $t_2$ are considered, it will be seen that the mean current resulting in the interval $t_1+t_2$ is equal to the mean value of the desired theoretical signal R in the same interval. This shows that, by a suitable choice of the time of generation of the current pulses I and/or of their duration, a signal can be generated whose mean value over a period of time (determined over an interval which is a multiple of the duration of an individual pulse but shorter than the period of a carrier-frequency signal R) corresponds in practice to the mean value of the desired theoretical signal.

By opening and closing the switch 2 (FIG. 1) several times per period 1/f of R, an advantageous form of the spectrum of I, in particular a reduction in the harmonics at the frequencies 3f, 5f, 7f, etc., is achieved. Since the current pulses I can reasonably be transmitted only when the signal R is positive, which is ensured on average in only 50% of all cases when the direct current part $P_O$ is missing, the above-mentioned direct current part $P_O$ is superimposed on the carrier-frequency signal so that the stated percentage is increased to above 50%, or to 100% as shown in the figure.

The signal formed by the current pulses I is designated as I(t) below. It can be represented as follows:

$$I(t) = C(t) \cdot \frac{U_O}{W} \quad (1)$$

C(t) is equal to 1 when switch 2 (FIG. 1) is closed, and is equal to 0 when switch 2 is open; $U_O$ is the amplitude of the supply d.c. voltage; and W is the value of the load resistance 1.

If the assumption chosen at the outset for the sake of simplicity, to the effect that the supply voltage is a direct current voltage $U_O$, is dispensed with, and the current signal I*(t) (see FIG. 5b) resulting at a sinusoidal supply voltage of, for example, frequency F of 50 Hz is analyzed, the following equation is obtained:

$$I^*(t) = U_O \cdot \sin(2\pi \cdot F \cdot t) \cdot \frac{C(t)}{W} = I(t) \cdot \sin(2\pi \cdot F \cdot t) \quad (2)$$

In this equation, $U_O$ is the amplitude of the supply voltage; F is the supply frequency, for example 50 Hz; C(t) is the control signal for the switch 2, this signal having been optimized on the assumption of a supply d.c. voltage $U_O$ (FIG. 5a); and W is the value of the load resistance 1 (FIG. 1).

A comparison of the two relationships for I(t) and I*(t) shows that the sinusoidal supply voltage leads to an amplitude modulation of the original current signal I(t). Hence, the spectrum of I*(t) can be derived in a very simple manner from that of I(t). Although the signal component at f will vanish completely, it will be replaced by 2 components at f+F and f−F. These two signals correspond to the sidebands in amplitude modulation, which are well known from modulation theory.

Each individual harmonic of the signal I*(t) is also divided in the same way into two spectral components with a spacing 2F. The basically favorable properties of the spectrum I(t) are retained, but equally strong network signals are found for I*(t), at f+F and f−F. These two principal components can be evaluated by the receiver by means of suitable demodulation methods.

Figure 3:
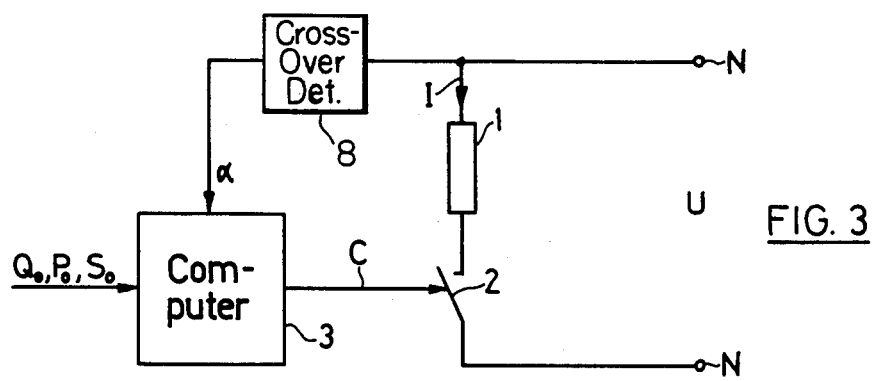
FIG. 3 is a block diagram of a first embodiment of a transmitter according to the invention.

As in the example described in FIGS. 2 to 4, the control signal C for the switch 2 is provided by a computer 3 according to FIGS. 6 and 7 in implementing the embodiment described with reference to FIGS. 5a and 5b. This differs from the computer 3 in FIGS. 3 and 4 essentially in that it does not require any information about the phase of the supply voltage, and accordingly requires neither an input for such information or a synchronization circuit (crossover detector) for synchronizing the switching times of the switch 2 with the actual phase of the supply voltage.

Figure 6:
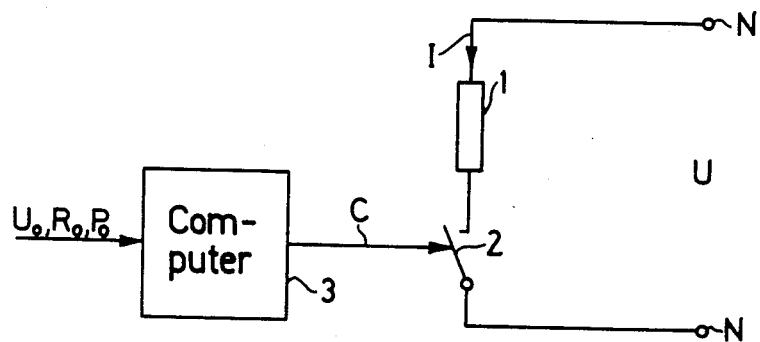
FIGS. 6 and 7 are block diagrams of respective transmitters to be used with the further embodiment of the invention.

As shown in FIG. 6, the computer 3 has an input for inputting the amplitude values $U_O$ (supply voltage), $R_O$ (signal R) and $P_O$ (superimposed direct current component). On the basis of suitable criteria already listed by way of example in the description of FIGS. 3 and 4, the computer 3 determines the optimum sequence of the pulses I and actuates the switch 2 with an appropriate control signal C(t).

Figure 7:
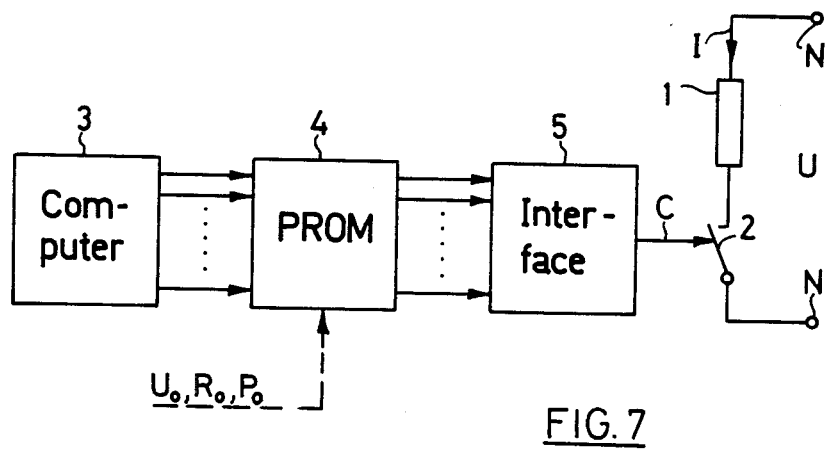

In the example of FIG. 7, a programmable read only memory (PROM) 4 and an interface 5 are arranged between the computer 3 and the switch 2. In this example, the times of transmission of the transmitted pulses I (FIG. 5a) are not calculated on-line but precomputed for a period of R as a function of the phase of R and stored in the memory 4. The computer 3 preferably calculates the actual phase value and then determines the address formed by this value. The computer 3 or the interface 5 then finds information about the further course of the pulse sequence under this address. In this way, the memory 4 and/or the interface 5 relieve the computer 3 of considerable overhead.

When the transmitter is implemented in microprocessor technology, the signals, in particular the transmission times of the pulses I, are preferably quantized. To do this, the range between 0 and $2\pi$ of the phase of the carrier-frequency signal is divided into, for example, 128 steps, and the actual phase value of the carrier-frequency signal R is determined by the computer 3, by means of a counting process with equidistant, equal increments. It is precisely this value which is the address for the memory 4, which in turn contains, as an output, for example, the sequence for the transmission of the transmission pulses I (FIG. 5a) for a certain period of time, during which, for example, up to 8 pulses can occur.

The memory 4 could supply, for example, the sequence "01101000" at a particular time. The interface 5, which accepts this sequence, interprets it, for example, as follows: in the time intervals 1, 4, 6, 7 and 8, each of which lasts for 1/128 of the period of the signal R, the switch 2 is to be kept open (this information is characterized by a "0" in the sequence), whereas it is to be closed in the intervals 2, 3 and 5 ("1" in the sequence). When all 8 intervals have elapsed, a new sequence is taken from the memory 4, the phase value of the carrier-frequency signal R which is valid in this case forming the address of the new sequence. In this case, the interface 5 can be a shift register.

The memory 4 can also output, as an output value, the duration of the next pulse and of the subsequent gap; at the end of this gap, the computer 3, with the then valid amplitude value, requests the duration of the next pulse and of the associated gap. In this case, the interface is provided as a time counter.

The method described, and the transmitter, are particularly suitable for transmission, to a central unit, of data concerning, for example, the counter reading from counters distributed over the network or concerning the executed command from ripple control receivers.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

What is claimed is:

1. A method for transmitting data via a line of an alternating current distribution network, in which a current signal carrying the data to be transmitted is generated and input into the network, comprising the steps of generating a current signal as a load signal by periodically connecting a load to a voltage source of the distribution network via a switch repeatedly for short time intervals in order to transmit on the line of the distribution network a series of current pulses whose times of generation and/or duration are such that the resulting transmitted current signal corresponds at least approximately to a desired theoretical signal of predetermined frequency, and modulating said transmitted current signal with data to produce said current signal carrying the data to be transmitted.

2. A method according to claim 1, wherein the switch is actuated several times per period to the supply voltage.

3. A method according to claim 2, wherein the generated current pulses are of constant duration.

4. A method according to claim 3, wherein the duration of the current pulses is such that a large number of current pulses can be generated per period of the supply voltage.

5. A method according to claim 4, wherein the duration of the current pulses is such that more than fifty current pulses can be generated per period of the supply voltage.

6. A method according to claim 4, wherein the desired theoretical signal is derived from a carrier-frequency signal, the period of which is smaller than the period of the supply voltage.

7. A method according to claim 6, wherein, at a supply voltage with a frequency of 50 Hz, said desired theoretical signal is provided at a frequency of about 100 to 2500 Hz.

8. A method according to claim 6, wherein said desired theoretical signal is obtained as a result of a signal portion being superimposed on the carrier-frequency signal and having the frequency of the supply voltage, wherein the carrier frequency signal has a frequency equal to that of the desired theoretical signal.

9. A method according to claim 1, wherein a control signal is generated to control the switch based on the theoretical assumption that the voltage source is constituted by a direct current voltage, and said control signal is generated such that the signal formed by arranging the current pulses side by side has as large a spectral part as possible at the frequency of the desired theoretical signal.

10. A method according to claim 9, wherein the value of the theoretically assumed direct current voltage is chosen to be equal to the amplitude of the alternating current voltage of the network.

11. A method according to claim 10, wherein a plurality of current pulses are generated per period of the desired theoretical signal.

12. A method according to claim 10, wherein the desired theoretical signal has a direct current component.

13. A method according to claim 10, wherein about 64 current pulses are generated per period of the desired theoretical signal.

14. A method according to claim 9, wherein a supply a.c. voltage is used as the voltage source, and the signal composed of the current pulses is amplitude-modulated, with the result that, instead of the signal component at the frequency (f) of the desired theoretical signal, two components having the frequencies $f+F$ and $f-F$ are formed, (F) representing the frequency of the supply a.c. voltage.

15. A transmitter for transmitting data via a line of an alternating current distribution network, in which a current signal carrying the data to be transmitted is generated and input into the network, comprising a load device, switch means responsive to a control signal for periodically connecting said load device to the line of said alternating current distribution network to generate a current signal consisting of a series of current pulses whose times of generation and/or duration are such that the resulting transmitted current signal corresponds at least approximately to a desired theoretical signal of predetermined frequency, and processor means including a computer responsive to selected chracteristics of the supply voltage of said alternating current distribution network and said desired theoretical signal for generating said control signal for controlling said switch means.

16. A transmitter according to claim 15, wherein said selected characteristics of said supply voltage include amplitude values and phase values.

17. A transmitter according to claim 16, wherein the desired theoretical signal is obtained as a result of a signal portion being superimposed on a carrier-frequency signal and having the frequency of the supply voltage, wherein the carrier frequency signal has a frequency equal to that of the desired theoretical signal.

18. A transmitter according to claim 17, wherein said processor means includes a memory connected to receive the output of said computer in the form of addresses of the memory pre-computed in accordance with possible phase values of the supply voltage and the carrier-frequency signal.

19. A transmitter according to claim 18, wherein said processor means includes binary counters for calculating the actual phase value of the signals.

20. A transmitter according to claim 19, wherein said processor means includes an interface circuit connected to receive the information regarding the current pulses to be generated from the output of said memory for the particular applied address and supplying an output in the form of said control signal to said switch means.

21. A transmitter according to claim 20, wherein said interface circuit comprises a shift register.

22. A transmitter according to claim 20, wherein said interface circuit is a component of the computer.

23. A transmitter according to claim 15, said load device comprises a resistance element.

24. A transmitter according to claim 15, wherein said selected characteristics include amplitude values of the supply voltage and of the desired theoretical signal.

25. A transmitter according to claim 24, wherein said selected characteristics additionally include the amplitude value of a direct current component of the desired theoretical signal.

26. A transmitter according to claim 25, wherein said processor means includes a memory connected to receive the output of the computer in the form of addresses of the memory determined in accordance with the times of transmission of the current pulses, which times are precomputed for a period of the desired theoretical signal as a function of its phase.

27. A transmitter according to claim 26, said computer operates to calculate the actual phase value of the desired theoretical signal and to determine the address formed by this value.

* * * * *